J. & W. PATERSON.
MOTOR PLOW.
APPLICATION FILED SEPT. 23, 1908.
916,774.
Patented Mar. 30, 1909.
2 SHEETS—SHEET 1.
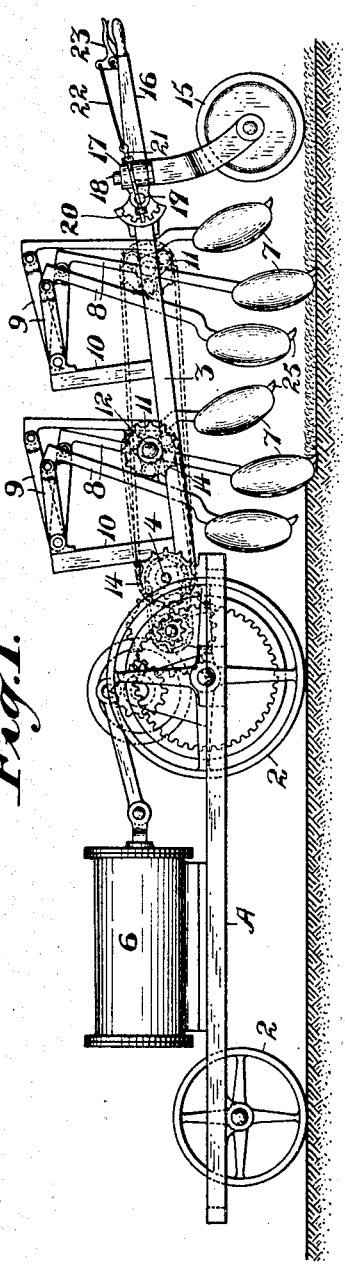
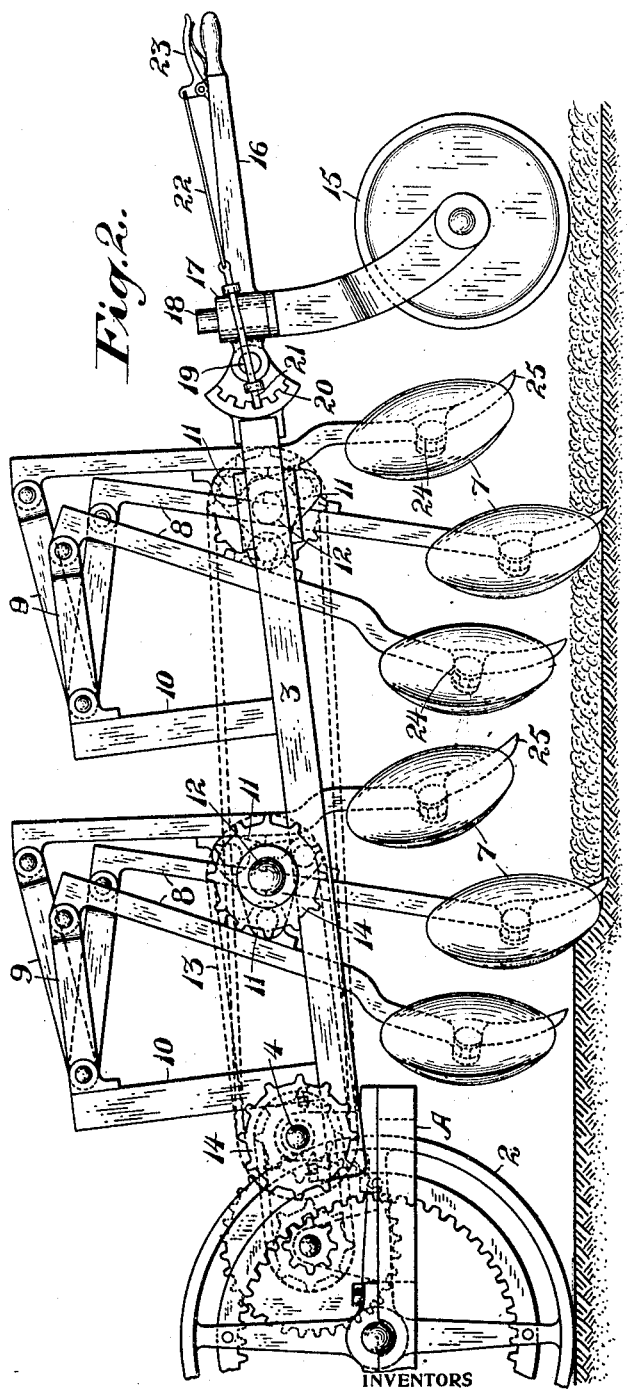
WITNESSES
F. C. Fliedner
INVENTORS
James Paterson &
William Paterson
BY Geo. H. Strong.
ATTORNEY

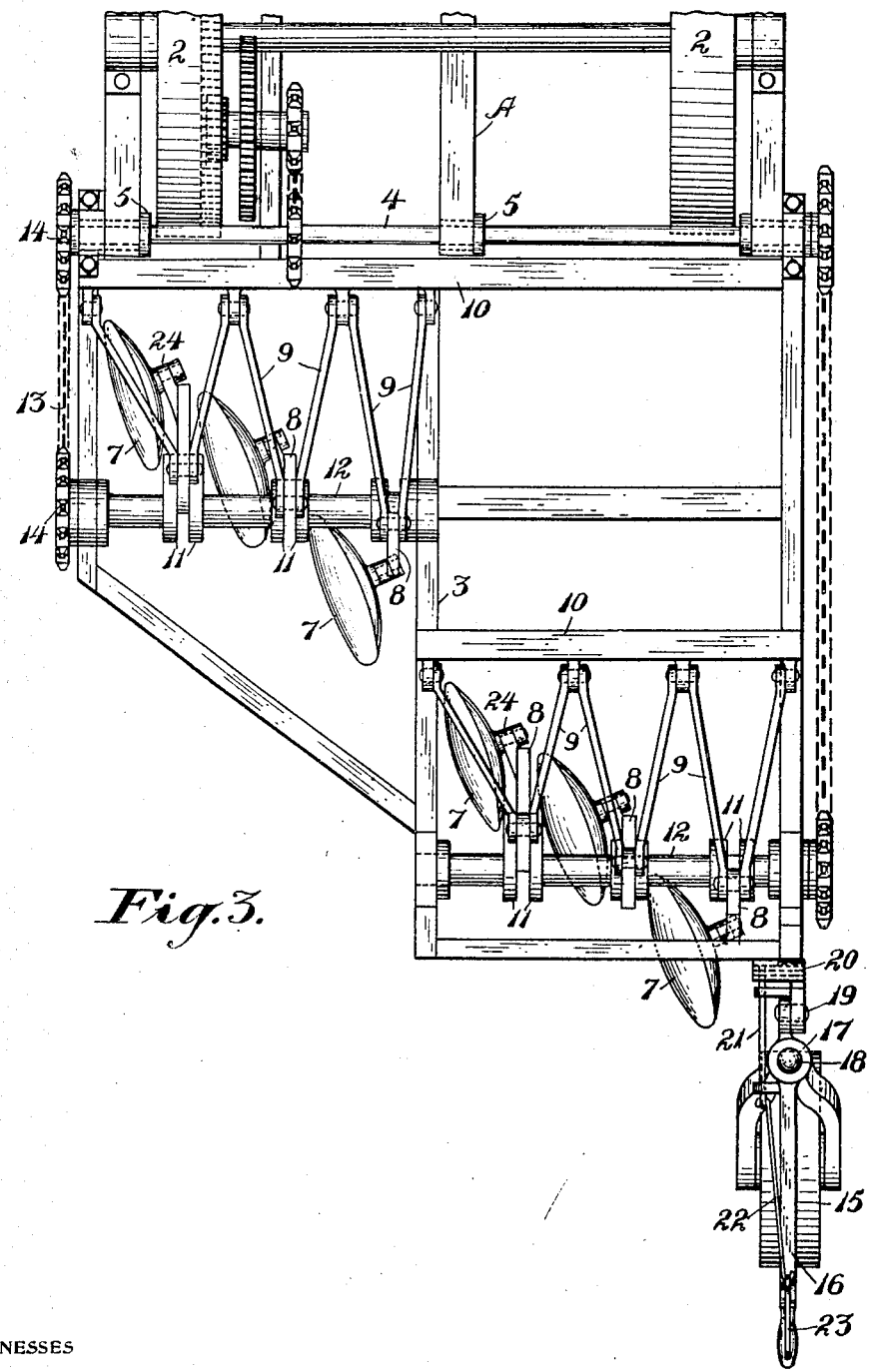

UNITED STATES PATENT OFFICE.

JAMES PATERSON AND WILLIAM PATERSON, OF FRESNO, CALIFORNIA.

MOTOR-PLOW.

No. 916,774.      Specification of Letters Patent.      Patented March 30, 1909.

Application filed September 23, 1908. Serial No. 454,363.

*To all whom it may concern:*

Be it known that we, JAMES PATERSON and WILLIAM PATERSON, citizens of the United States, residing at Fresno, in the county of Fresno and State of California, have invented new and useful Improvements in Motor-Plows, of which the following is a specification.

Our invention relates to improvements in plowing apparatus.

It consists in the combination of parts, and in details of construction which will be more fully explained by reference to the accompanying drawings, in which—

Figure 1 is a side elevation of the apparatus. Fig. 2 is an enlarged view of the rear portion. Fig. 3 is a plan view.

It is the object of our invention to provide a disk plowing apparatus, in which a series of disks are so mounted and actuated as to be successively and intermittently introduced into the soil and raised therefrom, said disks being revolved during their passage through the ground, and acting to assist in propelling the apparatus, in addition to their main function.

Various mechanism may be employed to carry out our invention. We have in the present case shown a mechanism which will produce satisfactory results.

In the drawings, A is a frame or carriage mounted upon wheels 2, and this carriage may be impelled over the land, preferably by a suitable motor; but it might be hauled by a team of animals.

3 is a supplemental plow frame. This frame is pivotally attached to the main frame of the motor-vehicle by means of a countershaft 4, revoluble inside of the pivot-boxes 5 which form the connection between the two frames, and about which the plow frame is movable to follow the irregularities and undulations of the surface over which it passes.

We have in the present case indicated a motor 6, from which power may be derived to drive the apparatus, and to operate the plows.

The plows consist of disks 7 which are independently mounted upon the lower ends of pitmen 8. The upper ends of these pitmen are connected by arms or walking-beams 9, with a fixed support or supports 10, carried upon the frame 3. The intermediate portions of these pitmen are connected with cranks 11 upon a crank-shaft 12 journaled upon the frame 3, so that as the crank is revolved, the pitmen and the disks are carried around with the cranks; the disks thus making a forward circular sweeping movement which raises them out of the ground as they advance, and then depresses them into the ground as they move rearwardly.

Power to drive the crank-shaft may be derived from the motor in any suitable manner. We have here shown the sprocket-chain 13 passing around pulleys 14, one of which is concentric with the fulcrum-shaft 4 between the two frames, and the other mounted upon the crank-shaft or shafts.

The cranks may be of any suitable or desired number, depending upon the power of the motor and the work to be done. They are preferably arranged equidistant around the crank-shaft, and at proper distances apart to suit the width of the furrows required.

The speed of the crank or eccentric shaft may be regulated with relation to the forward movement of the machine to suit the condition of the work to be done; and it will be seen that the movement of the crank-shaft connecting through the pitmen to carry the disks through the arcs of motion previously described, will successively force the disks into the ground, and the disks being revoluble, as hereafter described, the backward movement through the ground, will cause them to revolve upon their axes, and thus turn furrows during their passage through the ground. This action is also an important assistance toward propelling the apparatus; and the speed at which the disks travel being greater than the actual forward travel of the machine, it will be seen that they act in addition to the turning of the soil, to impel the machine, and reduce the actual tractive effort necessary to be applied to the driving wheels.

The number of cranks used will be determined by the power of the motor, and the work to be done; and the speed of revolution of the crank-shaft may also be regulated to suit conditions of the work.

The rear of the frame 3 is here shown as supported upon the caster-wheel 15, which may also serve as a gage-wheel.

The frame 3 may be raised or depressed with relation to this wheel by means of a lever 16, which connects with a vertically disposed sleeve 17 movable upon the stem or spindle 18 of the caster-wheel. The front end of the lever 16 is pivoted or fulcrumed as shown at 19.

20 is a toothed segment; 21 is a pawl actuated by a connecting rod 22, and a grip lever 23 contiguous to the handle of the lever 16, so that by disengaging the pawl and moving the lever 16, the rear of the frame 3 may be raised or depressed with relation to the caster-wheel, and the depth to which the plows enter the soil is also regulated.

The disks 7 are journaled upon bearings 24, which are formed in the lower ends of the pitmen 8 at such angles that the disks will stand at an angle of about 30° more or less, to the plane of travel of the pitman arms; and also at an oblique angle to the shank of the pitman so as to give the proper share-like set to the disk; and the rear or convexed portions of the disks have studs which are turnable upon these bearings, so that the disks may revolve freely when they enter the ground.

25 are colters, which also form landsides. They are attached to the extreme lower end and to one side of the pitman 8, and in addition to forming the colters to cut the side of the furrow down square, they also form landsides and counteract the side thrust of the disks. As the bearing-studs project from the convex sides of the disk, the concave sides will be perfectly smooth and plain to perform their service when passing through the soil.

We have found that the best results are obtained by connecting a plurality of disks with a crank-shaft. In the present case we have shown three cranks to a gang, the cranks being substantially equi-distant from each other, in the circle of their travel, and if more than one set is desired, the second set of disks will be carried by an independent shaft set slightly behind and out of line with the first one; and a third set again by another crank-shaft; thus increasing the number of crank-shafts, and operating the plowing disks in groups. Each crank-shaft will receive power by which to revolve it from the motor by means hereafter described.

The operation will then be as follows: The apparatus which carries the crank-shaft or shafts, being drawn over the ground, and the shaft caused to rotate by suitably connected mechanism, the upper ends of the pitmen arms will be given a rising and falling movement by means of the walking-beams 9; while the disks carried at the lower ends of the pitmen will be given a slight cycloidal movement, first advancing above the surface of the ground, then being depressed and forced into the ground, one after the other. As the edges of the disks strike the ground, they commence to rotate about their central studs, and continue to turn while they travel through the arc or segment which represents their movement through the ground. By reason of the angle at which the disks stand with the line of travel, they turn the soil over in the same manner as would be effected by an ordinary plow, and it will be seen that by reason of the resistance of the soil, the movement of the disks through the soil, will assist in the forward propulsion by reason of their rearward pressure; the greater the power exerted upon the plowing disks, the greater assistance will be given to the forward propulsion of the machine.

Having thus described our invention, what we claim and desire to secure by Letters Patent is—

1. A plowing apparatus consisting of pitmen, concavo-convex disks journaled and loosely turnable upon the lower ends of said pitmen, fulcrumed, vertically movable arms to which the upper ends of the pitmen are connected, a crank-shaft and cranks suitably arranged thereon, connections to said cranks and the central portions of the pitman, means for applying power to drive the crank-shaft whereby the disks are successively introduced into the ground and lifted therefrom, and fixed colters carried by the pitmen, and projecting below the disks.

2. A plowing apparatus consisting of a wheeled frame, a plow frame hinged thereto, a crank-shaft journaled upon said frame, vertically disposed pitmen having the central portions connected with the cranks, disks loosely revoluble upon the lower ends of the pitmen, a fixed support, walking-beams having one end fulcrumed to said support, and the other ends pivoted to the upper ends of the pitmen, and colters carried by the lower ends of the pitmen projecting below the disks.

3. In a plowing apparatus, a main vehicle and motor, a plow frame hinged to the rear of the main frame, a shaft journaled upon the plow frame and having a plurality of cranks spirally disposed thereon, vertical pitmen having the central portions connected with the cranks, fulcrumed arms with the free ends of which the upper ends of the pitmen are connected, disks loosely revoluble upon the lower ends of the pitmen, and at an angle with the planes of movement of the pitmen, sprocket-wheels upon the fulcrumed shaft of the plow frame, and upon the crank shaft respectively, and a chain and mechanism through which power is transmitted to revolve the crank-shaft.

4. In an apparatus of the character described, a main wheeled motor frame, a plow-frame hinged thereto, a plurality of shafts journaled to said frame out of line with each other, each having a series of cranks spirally arranged with relation to each other, pitmen having their central portions connected with said cranks, fulcrumed arms, with the free ends of which the upper ends of the pitmen are connected so as to be vertically movable, disks loosely revoluble upon the lower ends of the pitmen, colters fixed to the pitmen projecting below the disks, a caster-wheel disposed at the rear of the plow-frame having a vertical spindle, a lever having a sleeve slidable upon said spindle, and its front end pivoted with relation to the plow frame, and a pawl and segmental rack whereby the frame and plows may be raised or depressed.

5. In an apparatus of the character described, a wheeled motor-bearing vehicle with connections whereby said vehicle may be advanced upon the ground, a plow-frame hinged to the rear of the motor frame, a plurality of crank-shafts journaled out of line with each other upon said frame, pitmen having their central portions connected with the crank-shafts fulcrumed arms to which the upper ends of the pitmen are pivoted, offsets in the lower ends of the pitmen, bearings formed in the lower end of the pitmen at an angle with the plane or movement of the pitmen, concavo-convex disks with studs revoluble in the bearings, and colters carried by the lower ends of the pitmen, and projecting below the disks.

6. In a motor plowing apparatus, independent concavo-convex disks, suspended pitmen arms, to the lower ends of which the disks are loosely journaled, crank arms to which the central portions of the pitmen are connected, and colters carried by the lower ends of the pitmen and extending below the disks, and located on the pitman toward the unplowed side of the land.

In testimony whereof we have hereunto set our hands in presence of two subscribing witnesses.

JAMES PATERSON.
WILLIAM PATERSON.

Witnesses:
M. B. HARRIS,
CHARLES A. PENFIELD.